United States Patent Office 3,460,973
Patented Aug. 12, 1969

3,460,973
PROCESS FOR RENDERING GLASS AND
POLYESTERS ADHESIVE TO RUBBER
Pierre Hantzer and Jean Picard, Lyon, France, assignors to Societe Rhodiaceta, Paris, France, a French body corporate
No Drawing. Filed June 14, 1965, Ser. No. 463,914
Claims priority, application France, June 16, 1964, 978,464; Apr. 21, 1965, 14,027
Int. Cl. B44d 1/14; C08d 13/24; C03c 25/02
U.S. Cl. 117—76                                 8 Claims

ABSTRACT OF THE DISCLOSURE

Glass and polyester yarns are rendered capable of adhering to rubber by coating them with an aqueous dispersion comprising a polyisocyanate blocked with ε-caprolactam an emulsifying agent, and a rubber in latex form, and drying the coated yarns at a temperature of 100°–250° C. The lactam-blocked polyisocyanate is superior for this purpose to a phenol-blocked isocyanate in that the coated yarns can be stored for long periods with little or no loss in strength at this interface between the yarn and the rubber substrate.

---

This invention relates to methods for rendering glass and synthetic linear polyesters adhesive to natural or synthetic rubber, a process for their use, and the products so obtained. The synthetic linear polyesters referred to herein are composed of at least 85% by weight of an ester of a diol with terephthalic acid and include especially polyethylene terephthalate. The invention is more especially concerned with glass and such polyesters in the form of articles such as filaments, fibres, threads, strands, cabled yarns and fabrics.

Glass-based and polyester-based textile materials have very useful properties for reinforcing rubber, notably tensile strength, demensional stability, chemical stability and (in the case of glass) heat stability, but the conventional treatments (for example, coating with a composition based upon resorcinol, formaldehyde and latex, hereinafter briefly termed "R.F.L."), are unfortunately inadequate to cause glass or polyesters to adhere sufficiently to a natural or synthetic rubber because of the chemical unreactivity of glass-based and polyester-based materials. In order to improve the adhesion of such materials to rubber, it has been proposed to precede the R.F.L. treatment by coating the material with a polyisocyanate-based composition. A free polyisocyanate in organic solution, such as methylene chloride, dichloroethane, or methyl ethyl ketone, has been employed for this purpose, but, while this method gives satisfactory strengths of adhesion, it is difficult to use industrially, because it gives rise to problems of, e.g., cost, toxicity and inflammability.

It has also been proposed to employ an aqueous dispersion containing an addition product of a polyisocyanate, from which the latter is liberated by heating. These addition products, also known as "blocked isocyanates" or "masked isocyanates," are described in the literature. For example, to obtain good adhesion of rubber to cellulosic materials, such as cotton and rayon, it has been proposed to use an aqueous composition consisting of a polyisocyanate blocked by a phenol. Moreover, when using a polyisocyanate blocked by an amide, namely acetamide, rather than a polyisocyanate blocked by a phenol, the adhesion is much weaker and is considerably reduced by moisture.

It has now been that glass and polyesters may be satisfactorily rendered adhesive to natural and synthetic rubbers by treatment with an aqueous composition containing as it only anchoring agent a polyisocyanate blocked by a lactam, more especially epsilon-caprolactam. These compositions are aqueous dispersions comprising at least 1% by weight of an addition product of a polyisocyanate and a lactam, at least 0.2% by weight of an emulsifying agent, and at least 1% by weight of a latex of a natural or synthetic rubber. It is rather unexpected that such compositions should promote the adhesion of glass and polyesters to rubber, both in the dry and wet states, since it is known that polyisocyanates blocked by amides such as acetamide are not satisfactory for rendering cellulosic materials adhesive to rubber.

Addition products of polyisocyanates and lactams are known per se. They are prepared by reacting a poly-functional aliphatic or aromatic, substituted or unsubstituted polyisocyanate with a lactam such as epsilon-caprolactam, delta-valerolactam, gamma-butryolactam, or beta-propiolactam. The polyisocyanates employed include especially diisocyanates such as meta-tolylene dissocycanates, separately or in mixtures, 1,6-diisocyanatohexane, 4,4'-diisocyanatodiphenylmethane, phenylene diisocyanates, naphthylene diisocyanates, and cyclohexenylene diisocyanate, which are commercially obtainable, and of which 4,4-diisocyanatodiphenylmethane is preferred. The addition compound is preferably 2.5 to 5% of the composition. (Except where otherwise specified, the percentages given herein are calculated on the weight of dry material in relation to the total weight of the composition.)

The emulsifying agents are known per se, and are described in the literature, see, e.g., Kirk-Othmer "Encyclopaedia of Chemical Technology" under the headings "Emulsions" and "Surface Active Agents," and Hall's Modern Textile Auxiliaries" (1962). Carboxymethyl cellulose and methoxycellulose are the preferred emulsifying agents. Generally speaking, concentrations of more than 2% are not necessary, the preferred range being from 0.5% to 1%.

The latex may be a latex of natural or synthetic rubber. Preferably synthetic latexes are used, for example those produced from copolymers of butadiene with styrene, vinylpyridine, or acrylonitrile, and especially terpolymers such as those of vinylpryridine-butadiene-styrene. Preferably, the dry weight of the latex constiutes from 3% to 8% of the adhesive composition. Percentages above 10% unnecessarily increase the cost without concomitant advantages.

To prepare the new adhesive compositions, preferably the emulsifying agent is first added to deionized water and then the blocked polyisocyanate, and finally, slowly, the latex.

According to the invention a process for rendering glass or a synthetic linear polyester adhesive to rubber (natural or synthetic) comprises treating the said glass or polyester with an aqueous dispersion as above defined, and then drying it. Although this treatment may be carried out by any known method, it is preferred to immerse the glass or polyester article, slack or under tension, directly in the composition, and then to dry it at between 100° and 250° C. for from fifteen to three hundred seconds, preferably at 200° C. for from 60 to 120 seconds. After drying, the proportion of adhesive deposited on the polyester is preferably from 1.5% to 7%, preferably from 3% to 5%, dry weight.

The coated article may then be treated with an aqueous dispersion of phenol-aldehyde-latex, such as resorcinol-formaldehyde-latex (R.F.L.), in accordance with the technique commonly used in the rubber industry, and the treatment may then be terminated by drying at 150–250° C., preferably at 200–235° C. The duration of the drying, which varies with the temperature, is between fifteen seconds and twenty minutes.

Although these two treatments are generally carried out in direct succession, a considerable delay may occur between the two, because it has been observed that an appreciable time may elapse between the first and second treatments without any influence on the strength of adhesion of the treated articles to rubber. This may be advantageous to many users already equipped to perform the R.F.L. treatment.

Glass and polyesters treated in accordance with the invention are bonded to rubber by vulcanization in manner known per se.

In the following examples, the strength of adhesion of the cabled yarns to rubber is measured by vulcanizing a small specimen of belt rubber 10 mm. long and 15 mm. in diameter to the treated cabled yarn. After resting for 24 hours, the strength necessary to detach the cabled yarn from the specimen is measured on a horizontal dynamometer of the "constant elongation gradient" Amsler type. The rubber has the following composition:

| | Parts by weight |
|---|---|
| Smoked sheets | 100 |
| Easy-processing channel black | 43 |
| Zinc oxide | 3 |
| Stearic acid | 2 |
| Pine tar | 2 |
| Phenyl-β-naphthylamine | 1 |
| Benzothiazyl disulphide | 0.8 |
| Sulphur | 3 |

EXAMPLE 1

7 g. of methoxy cellulose (registered trademark "Methocel 90 HGDG") are added with stirring to 900 cm.$^3$ of water and 30 g. of 4,4'-diisocyanatodiphenylmethane blocked by epsilon-caprolactam are then added. Finally, 150 g. of an aqueous dispersion, containing 41% of solids, of a butadiene-styrene-vinylpyridine copolymer (70:15:15 by weight; "Polysar 781") are added slowly.

A cabled polyethylene terephthalate yarn, having a count of about 2,000 deniers and consisting of an assembly, having an S-twist of 512 turns per metre, of two initial yarns of 1,000 deniers each containing 200 filaments with a Z-twist of 512 turns per metre, is passed at a rate of 10 metres per minute through the composition thus prepared, and is then dried for 70 seconds at 200° C. The deposit on the cabled yarn is about 4% by weight. After storage for 24 hours, the treated cabled yarn is vulcanized to rubber at 145° C. for 45 minutes. It then has an average strength of adhesion of 10 kg. Specimens are immersed for 7 days in water at 25° C. The average strength of adhesion, measured under the same conditions as before, is 9.2 kg. which corresponds to a loss of only 8%.

EXAMPLE 2

The treated cabled yarn of Example 1 is continuously passed, immediately after drying, through an aqueous dispersion of R.F.L. prepared by the procedure described below. It is then dried for 72 seconds at 200° C. The deposit is about 6.5% by weight. After being left for 24 hours, the treated yarn is vulcanized to rubber at 145° C. for 45 minutes. It has an average strength of adhesion of 11.8 kg. Specimens are immersed for 7 days in water at 25° C. The average strength of adhesion in the wet state is 10.1 kg. which corresponds to a loss of 14.4% as compared with the dry state.

The R.F.L. dispersion used in this example is prepared from the two following compositions A and B.

Composition A

| | G. |
|---|---|
| Water | 423 |
| Resorcinol | 37 |
| Sodium hydroxide solution (280 g./l.) | 3.7 |
| Formaldehyde solution (317 g./l.) | 56.3 |

Composition B

| | G. |
|---|---|
| Butadiene-styrene-vinylpyridine containing 42% of solids (Gentac brand) | 425 |
| Butadiene-styrene latex containing 67% of solids (Polysar 722 brand) | 283 |
| Water | 1,089 |

Composition A is allowed to stand for 6 hours at 15° C., and then adjusted to a pH of 8.6 with sodium hydroxide solution. Finally composition B is slowly added. The mixture is allowed to mature for 24 hours at 15° C. before use.

EXAMPLE 3

To show the influence of the drying conditions of the adhesive composition of the invention, Example 2 is repeated, the duration and the temperature of this treatment being varied (while the drying conditions of the R.F.L. coating remain unchanged). The results set out in the following table show that, under all the conditions tested, sufficient strengths of adhesion are obtained for reinforced rubber used, e.g., in conveyor belts or straps.

TABLE

| Time in seconds | Temperature in ° C. | Average strength of adhesion in kg. |
|---|---|---|
| 120 | 120 | 9.2 |
| 70 | 150 | 8.9 |
| 70 | 180 | 10.6 |
| 70 | 200 | 11.8 |

EXAMPLE 4

10.9 g. of methoxycellulose (registered trademark "Methocel 90 HGDG") are added with stirring to 900 cm.$^3$ of water, and 30 g. of 4,4'-diisocyanatodiphenylmethane blocked by epsilon-caprolactam are then added. Finally, 150 g. of an aqueous dispersion, containing 41% of solids, of a butadiene-styrene-vinylpyridine copolymer ("Polysar 781") are added slowly.

A cabled glass yarn of six untwisted filaments each of about 300 denier is passed at a rate of 20 m./minute through the composition thus prepared, and then dried for thirty seconds at 200° C. The yarn is then passed through the R.F.L. dispersion described in Example 2 and dried for fifteen seconds at 235° C. The total deposit on the yarn is about 3.9% by weight. After vulcanization to rubber, the average strength of adhesion, measured under the conditions described above, is 10.5 kg.

We claim:
1. A process for rendering a textile material selected from the group consisting of glass and synthetic linear polyester textile materials, adhesive to rubber, which comprises coating the said textile material with a composition comprising an aqueous dispersion containing, by weight:

(A) as sole anchoring agent from 1% to 5% of an addition product of a polyisocyanate and ε-caprolactam,
(B) from 0.2 to 2% of an emulsifying agent,
(C) from 1 to 10% of a latex of a rubber, and thereafter drying said coated material for 15 to 300 seconds at a temperature between 100 and 250° C.

2. Process according to claim 1, wherein polyethylene terephthalate textile material is coated.

3. Process according to claim 2, wherein carboxymethyl cellulose is used as the emulsifying agent B, and a latex of a vinyl pyridine-butadiene-styrene rubber as the latex C.

4. Process according to claim 1, wherein the coated textile material is dried for 60 to 120 seconds at 200° C.

5. Process according to claim 1, wherein a glass textile material is coated.

6. Process according to claim 5, wherein carboxymethyl cellulose is used as the emulsifying agent B, and a latex of a vinyl pyridine-butadiene-styrene rubber as the latex C.

7. Process for bonding a yarn made of a material selected from the group which consists of yarns of glass and of synthetic linear polyesters to a rubber substrate, which comprises coating the said yarn with an aqueous dispersion comprising at least 1% by weight of an addition product of a polyisocyanate and ε-caprolactam, at least 0.2% by weight of an emulsifying agent, and at least 1% by weight of a latex of a rubber, drying the coating thus formed, and vulcanizing the rubber of the substrate in contact with the coated yarn.

8. Process according to claim 7, wherein the yarn is coated with a dispersion in which the polyisocyanate is 4,4'-diisocyanatodiphenyl methane, and the latex is a latex of a vinyl pyridine-butadiene-styrene rubber.

References Cited
UNITED STATES PATENTS

| | | |
|---|---|---|
| 2,801,990 | 8/1957 | Seeger et al. |
| 2,994,671 | 8/1961 | Thompson. |
| 3,222,238 | 12/1965 | Krysiak. |
| 3,245,961 | 4/1966 | Fetscher et al. |
| 3,278,333 | 10/1966 | Titzmann et al. |
| 3,307,966 | 3/1967 | Shoaf. |

WILLIAM D. MARTIN, Primary Examiner

R. HUSACK, Assistant Examiner

U.S. Cl. X.R.

117—126, 138; 156—110